Feb. 19, 1957 C. P. LENHERR 2,781,732
APPARATUS FOR PRODUCING ROUNDED DOUGH BODIES
FOR THE FORMATION OF BAKERY ROLLS AND BUNS
Filed March 10, 1953 8 Sheets-Sheet 2
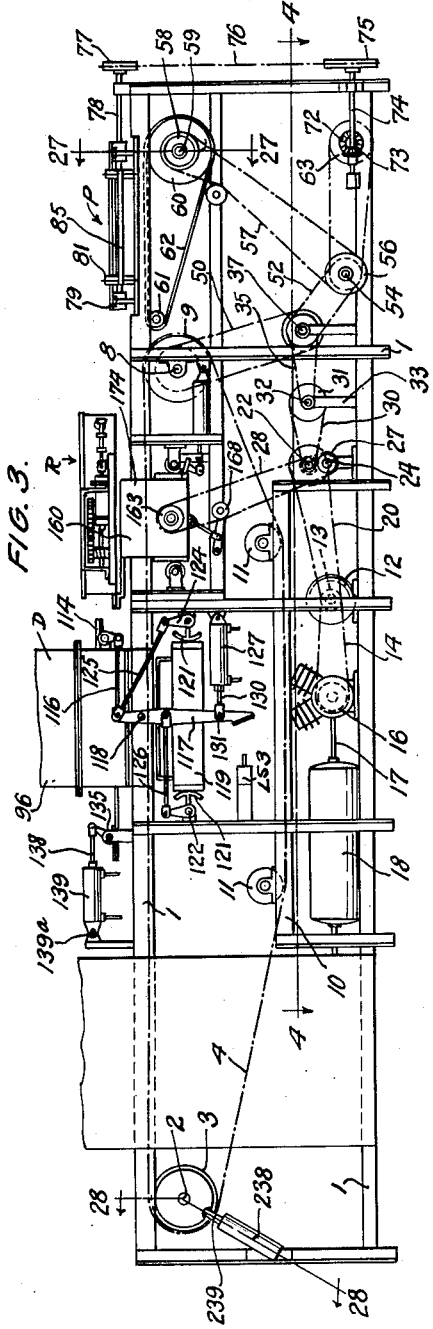
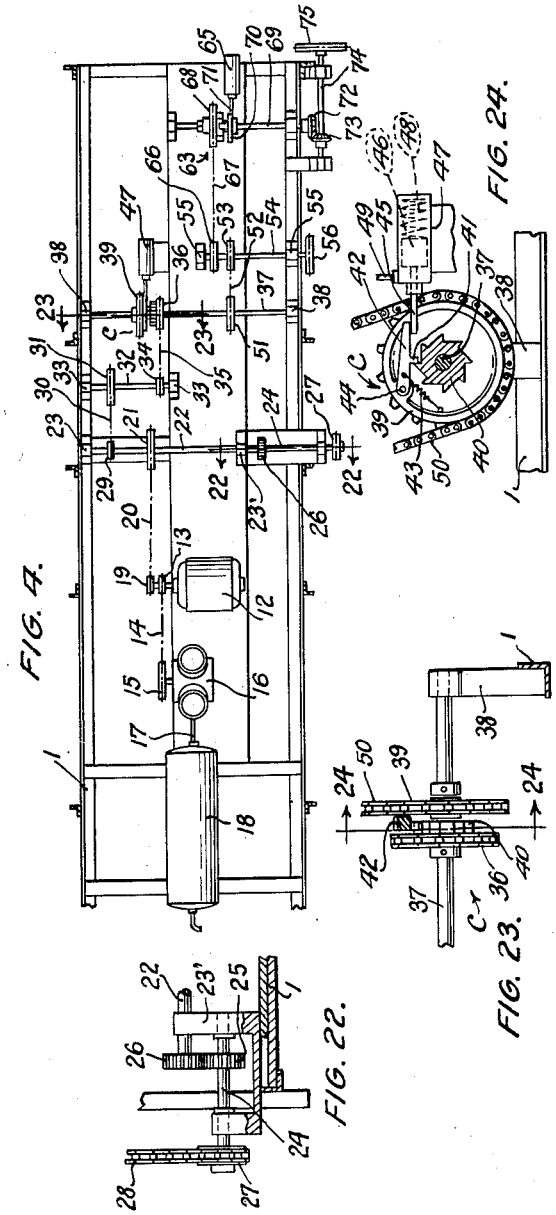
INVENTOR
CHESTER P. LENHERR
BY William S. McDowell
ATTORNEY Feb. 19, 1957 C. P. LENHERR 2,781,732
APPARATUS FOR PRODUCING ROUNDED DOUGH BODIES
FOR THE FORMATION OF BAKERY ROLLS AND BUNS
Filed March 10, 1953 8 Sheets-Sheet 3

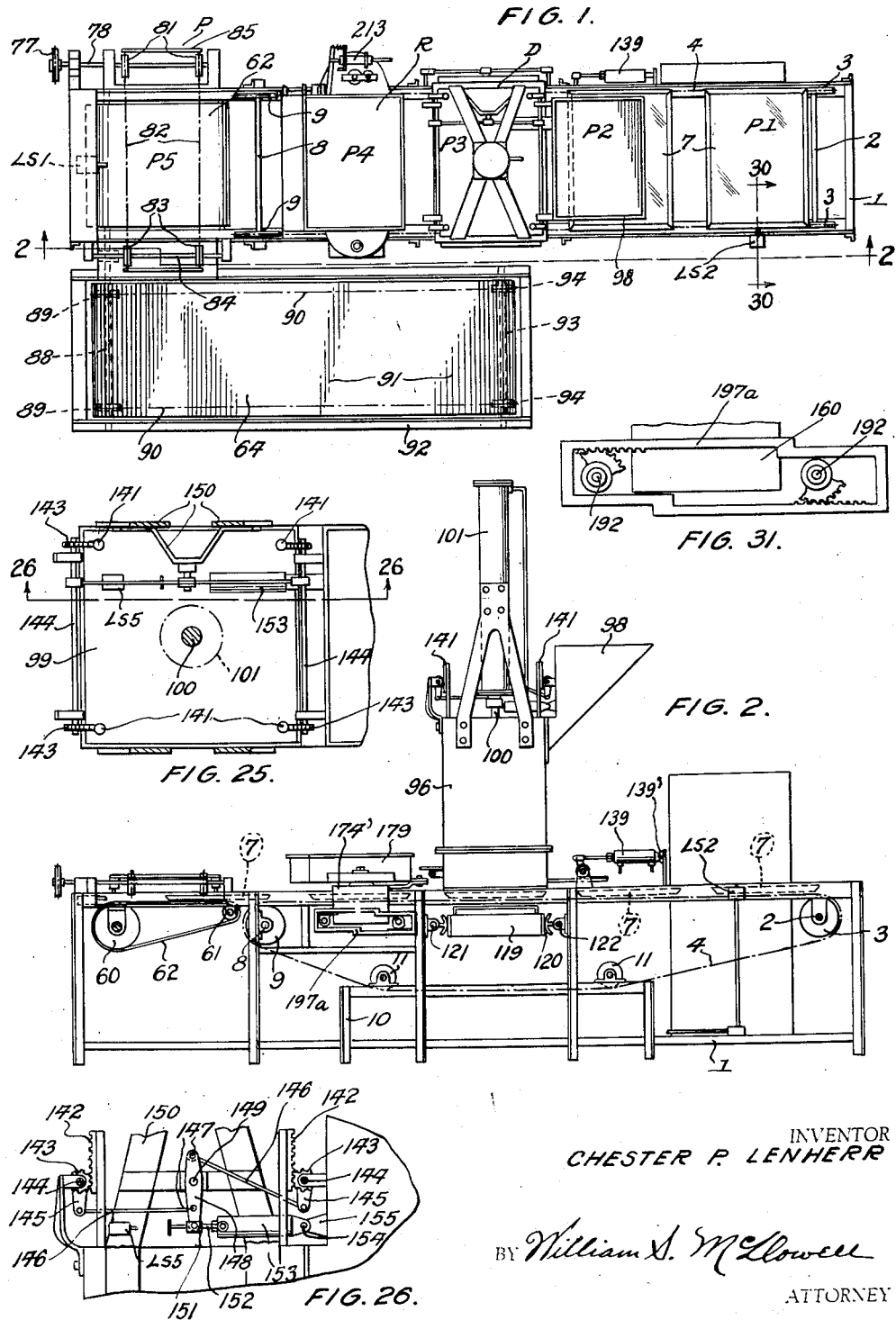

INVENTOR
CHESTER P. LENHERR
BY William S. McDowell
ATTORNEY

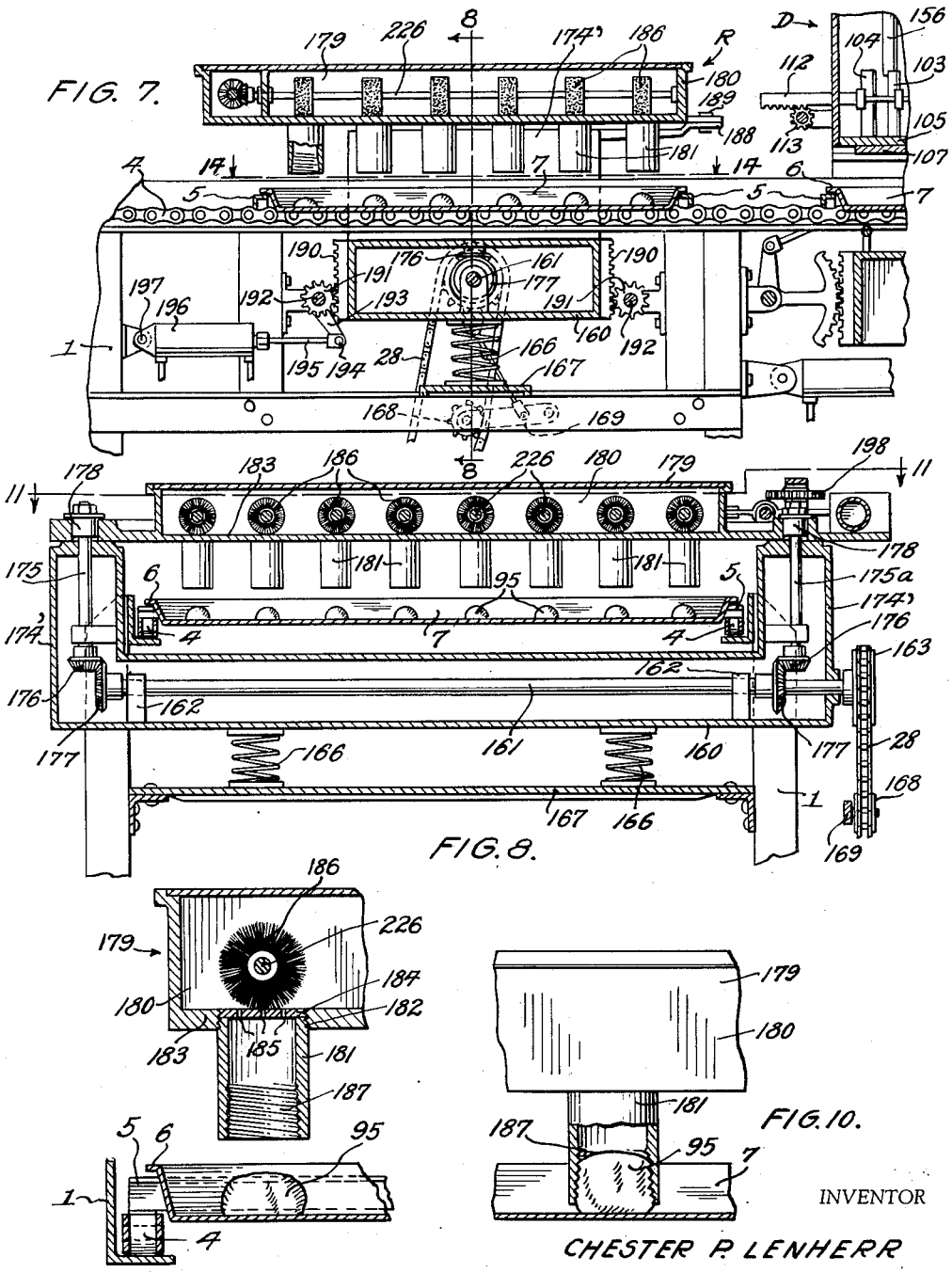

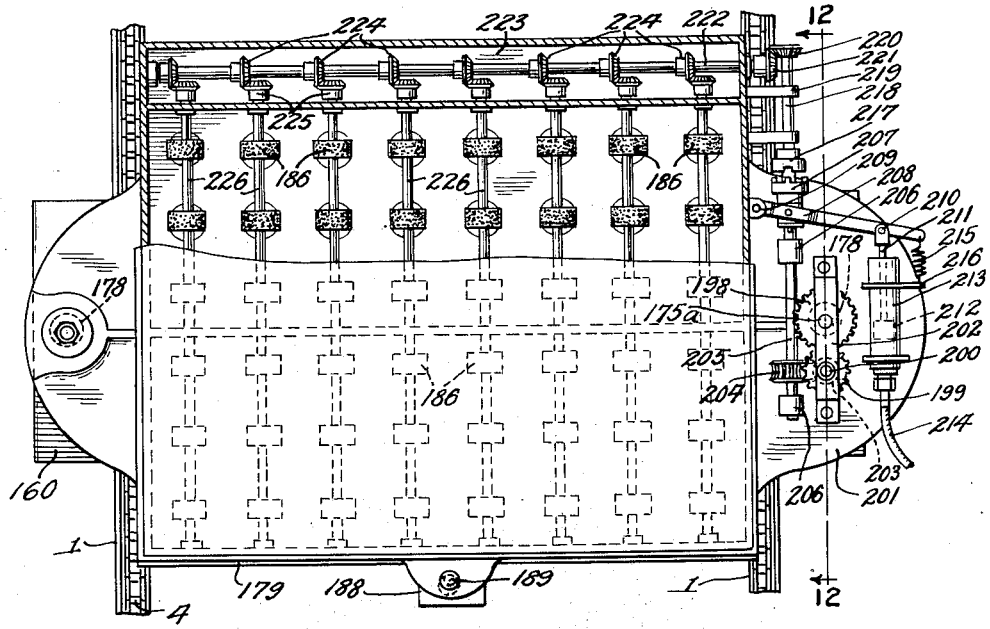
FIG. 11.
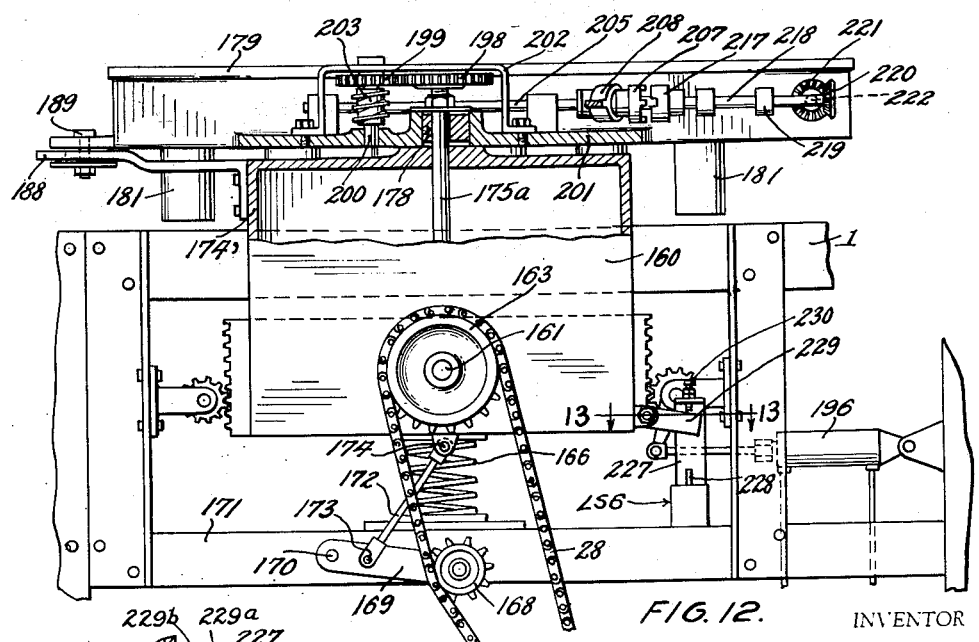
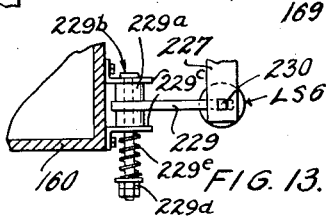
FIG. 12.
FIG. 13.
INVENTOR
CHESTER P. LENHERR
BY William S. McDowell
ATTORNEY

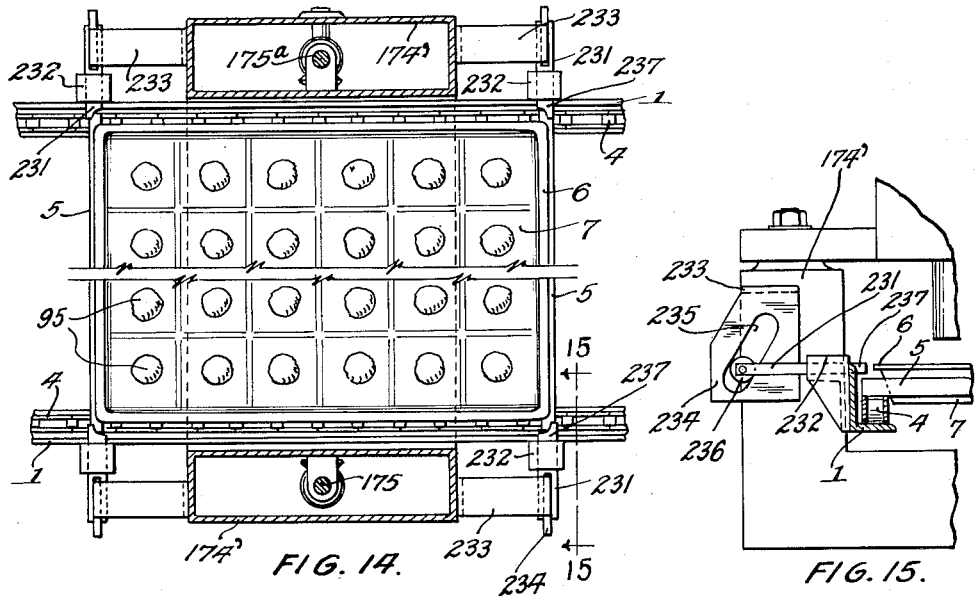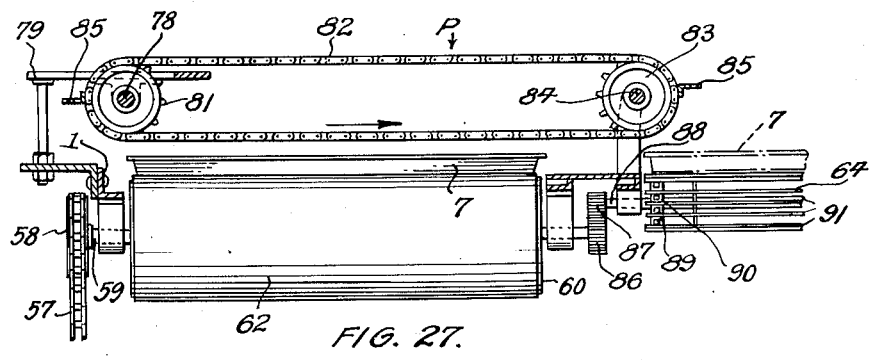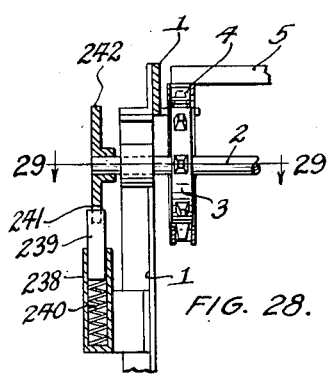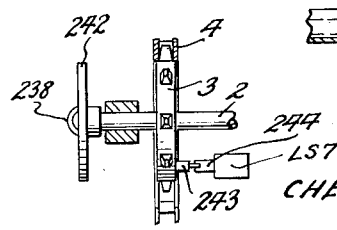

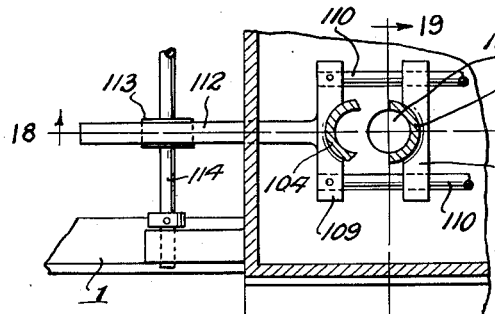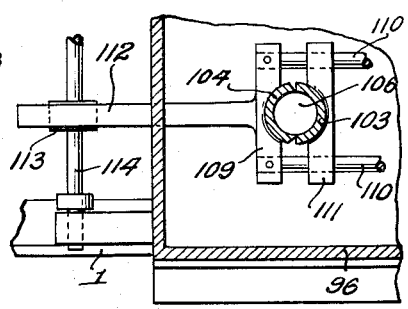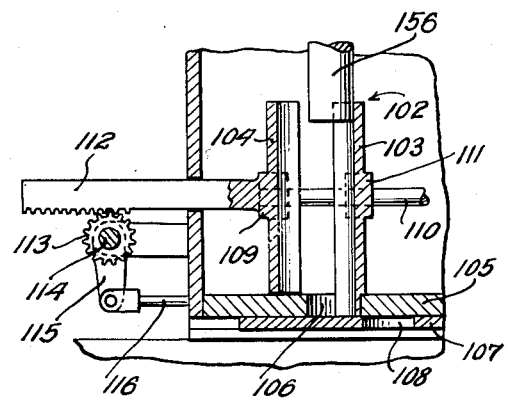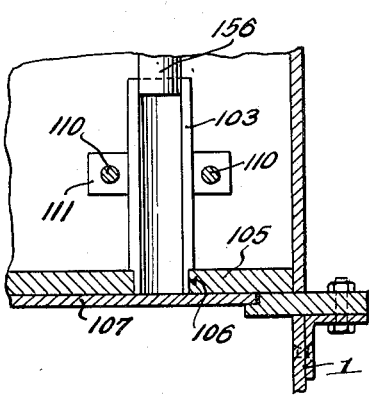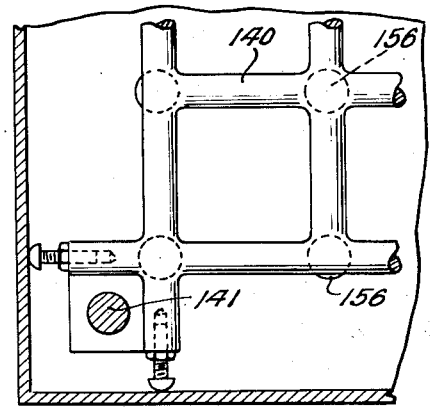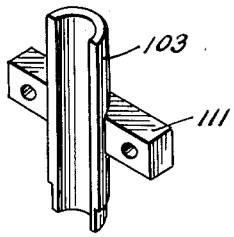
INVENTOR
CHESTER P. LENHERR

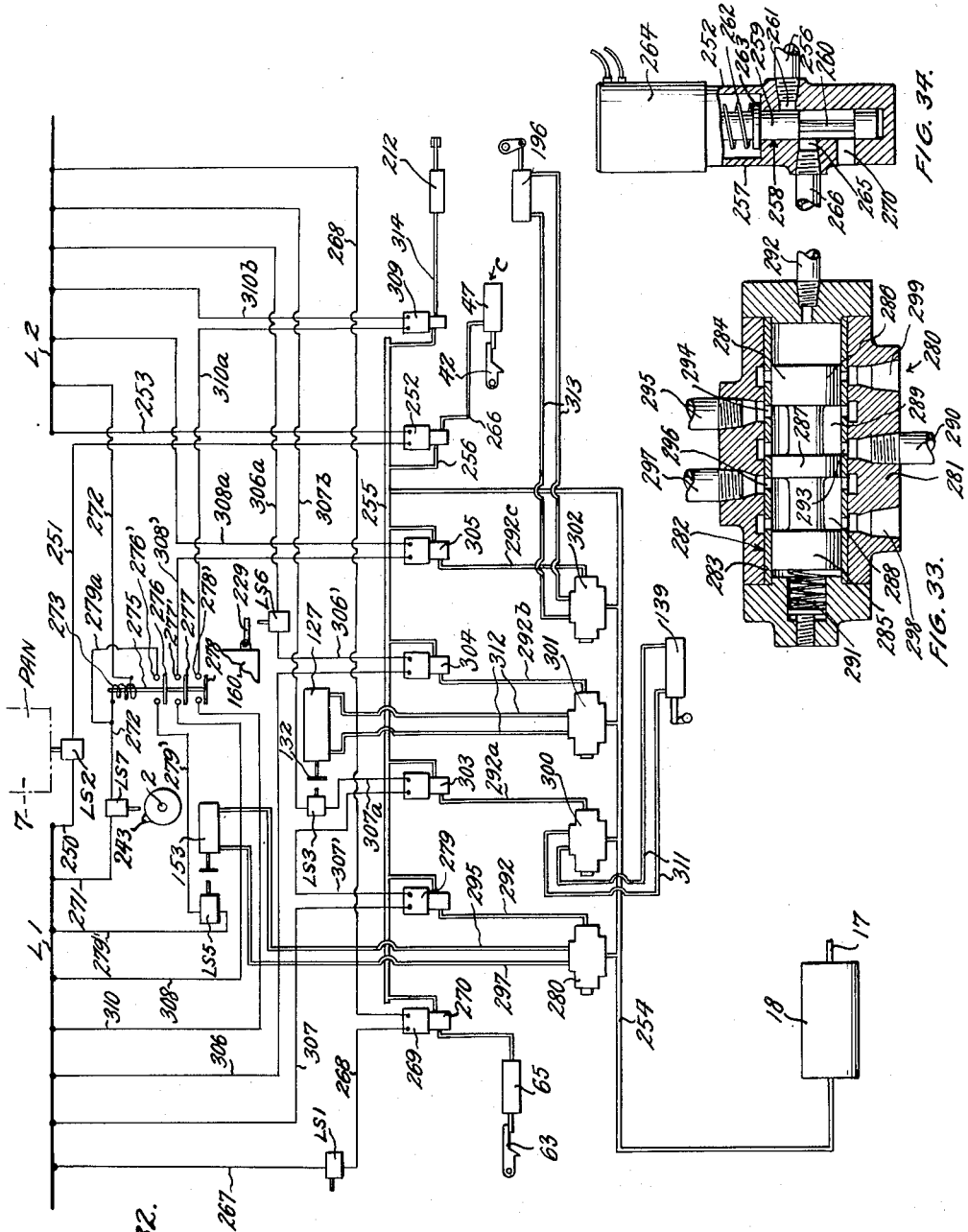

United States Patent Office 2,781,732
Patented Feb. 19, 1957

2,781,732

APPARATUS FOR PRODUCING ROUNDED DOUGH BODIES FOR THE FORMATION OF BAKERY ROLLS AND BUNS

Chester P. Lenherr, Newark, N. J., assignor to White Castle System, Inc., Columbus, Ohio, a corporation of Delaware Application March 10, 1953, Serial No. 341,497

10 Claims. (Cl. 107—4)

This invention relates to apparatus for forming and shaping dough bodies preparatory to proofing and baking operations, the invention having particular reference to automatic means adapted for the formation and shaping of dough bodies from which bread rolls or buns are formed.

In the making of small articles of bread, such as rolls or buns, use is made of various separate machines or appliances in forming the small bodies of bread dough from which the baked articles are produced. Such separate appliances are used to divide and form initially the roll or bun-producing bodies from larger masses of mixed dough. Also mechanically operated devices, known as rounders, are used in shaping the initially and roughly formed dough bodies so that the baked rolls or buns formed by such devices will possess a desired uniform external contour or configuration. However, the separate machines or appliances as presently operated require in addition to their mechanical operation a considerable number of hand-performed operations, particularly in the matter of feeding, removing and transferring the products into and from the machines, and in placing the shaped or rounded dough bodies in rows on pans or trays adapted for insertion into the controlled atmospheres of proofing rooms and baking ovens. These necessary hand operations have involved the employment of considerable labor and added substantially to the cost of producing such baked products.

Accordingly, it is a leading object of the present invention to provide integrated, automatically operating apparatus by which the various separate operations above noted are coordinated in a single composite machine and carried out in a more efficient, expeditious, and cost-reducing manner.

Among other important objects of the present invention are: to provide an automatically operating mechanism for forming and depositing in spaced row-forming order on conveyor-advanced trays or pans bodies of baker's dough from which the small baked products are formed; to provide in such apparatus an automatically operating rounder mechanism by which the small dough bodies, after being deposited on pans or trays by the body-forming or depositing mechanism, are mechanically manipulated in a manner to shape or contour the same so that the finally baked products will possess a uniform configuration to produce baked articles of desired shape; to provide in a machine of this category an intermittently operating conveyor mechanism by which the dough body-receiving pans or trays are brought successively into operative registry with the body-forming, depositing, and rounding mechanisms and conducted to a discharge station; to provide a machine in which the dough bodies, immediately following their formation and ejection from the body-forming and depositing mechanism, are positioned on conveyor-advanced pans or trays in orderly rows and are maintained in their original positions of deposit on such pans or trays throughout all subsequent operations of shaping, rounding, proofing, and oven baking, until the products are finally completed; to provide apparatus for reducing the amount of manual labor hitherto involved in the commercial baking of small articles such as sandwich buns or rolls, and reducing the costs incident to such operations; to provide in such apparatus automatic controls for governing the sequentially performed operations of ejecting initially formed dough bodies from a hopper and depositing the same on conveyor-supported pans or trays, and thereafter presenting the bodies, while on the pans or trays, to the action of individual rounding devices in imparting desired shapes to such bodies prior to baking thereof; to provide in such machines an improved body-forming and depositing mechanism, wherein the latter is of a construction to produce simultaneously a sufficient number of separately formed bodies of dough to fill completely a given pan or tray advanced by the machine along a conveyor way; to provide an improved rounding mechanism composed of an oscillatory head containing a number of depending tubes, the latter being so formed as to receive within the open lower ends thereof upon downward bodily movement of said head the separate dough bodies deposited on the pans or trays, whereby to manipulate said bodies to produce desired shaping or contouring thereof; to provide an intermittently operating conveyor for a machine of the character set forth which functions automatically to feed successively the roll-receiving pans or trays into registry with the depositing and rounding mechanisms in a step-by-step manner, and when the pans or trays are deposited on the conveyor mechanism; and to provide a machine of this character which constitutes an improvement generally upon prior devices employed in the formation of bakery products.

With these and other objects in view, which will appear as the description proceeds, the invention accordingly consists in the novel features of construction, combinations of elements, and arrangements of parts hereinafter fully described and pointed out in the appended claims.

In the accompanying drawings:

Fig. 1 is a top plan view of the overall machine;

Fig. 2 is a vertical sectional view along the line 2—2 of Fig. 1;

Fig. 3 is a side elevational view looking toward the side of the machine opposite that shown in Fig. 2;

Fig. 4 is a horizontal section along the line 4—4 of Fig. 3;

Fig. 7 is a medial longitudinal vertical sectional view taken through the rounder mechanism;

Fig. 8 is a vertical sectional view along the line 8—8 of Fig. 7;

Fig. 9 is a detail fragmentary vertical sectional view taken through the rounder heads and one of its rotary flour-dusting brushes;

Fig. 10 is a similar view, with the rounder head in contact with a dough body;

Fig. 11 is a view partly in horizontal section and taken along the line 11—11 of Fig. 8;

Fig. 12 is a vertical sectional view taken along the line 12—12 of Fig. 11;

Fig. 13 is a horizontal sectional view along the line 13—13 of Fig. 12;

Fig. 14 is a horizontal sectional view along the line 14—14 of Fig. 7;

Fig. 15 is a detailed vertical sectional view along the line 15—15 of Fig. 14;

Fig. 16 is a detail horizontal sectional view taken through one of the split-cylinder dough-discharging tubes of the dispensing and depositing apparatus;

Fig. 17 is a similar view with the split cylinder elements closed;

Fig. 18 is a vertical sectional view along the line 18—18 of Fig. 16;

Fig. 19 is a similar view along the line 19—19 of Fig. 16;

Fig. 20 is a detail perspective view of one of the stationary halves of the dough-dispensing sleeves of the deposit mechanism;

Fig. 21 is a horizontal sectional view along the line 21—21 of Fig. 5;

Fig. 22 is a vertical sectional view along the line 22—22 of Fig. 4;

Fig. 23 is a similar view along the line 23—23 of Fig. 4;

Fig. 24 is a detailed vertical sectional view along the line 24—24 of Fig. 23;

Fig. 25 is a horizontal sectional view looking into the upper end portion of the hopper chamber;

Fig. 26 is a vertical sectional view along the line 26—26 of Fig. 25;

Fig. 27 is a vertical sectional view taken along the line 27—27 of Fig. 3;

Fig. 28 is a detail sectional view along the line 28—28 of Fig. 3;

Fig. 29 is a horizontal sectional view along the line 29—29 of Fig. 8;

Fig. 30 is a detail vertical sectional view along the line 30—30 of Fig. 1, showing the pan-actuated starter switch;

Fig. 31 is a detail side elevational view of the rack-pinion frame associated with the rounder mechanism;

Fig. 32 is a diagrammatic view of the electrical and pneumatic circuits of the apparatus;

Fig. 33 is a detail vertical sectional view taken through one of the three-way valves employed in the pneumatic circuit; and Fig. 34 is a vertical sectional view taken through one of the solenoid actuated pilot valves.

Figures 5, 6:
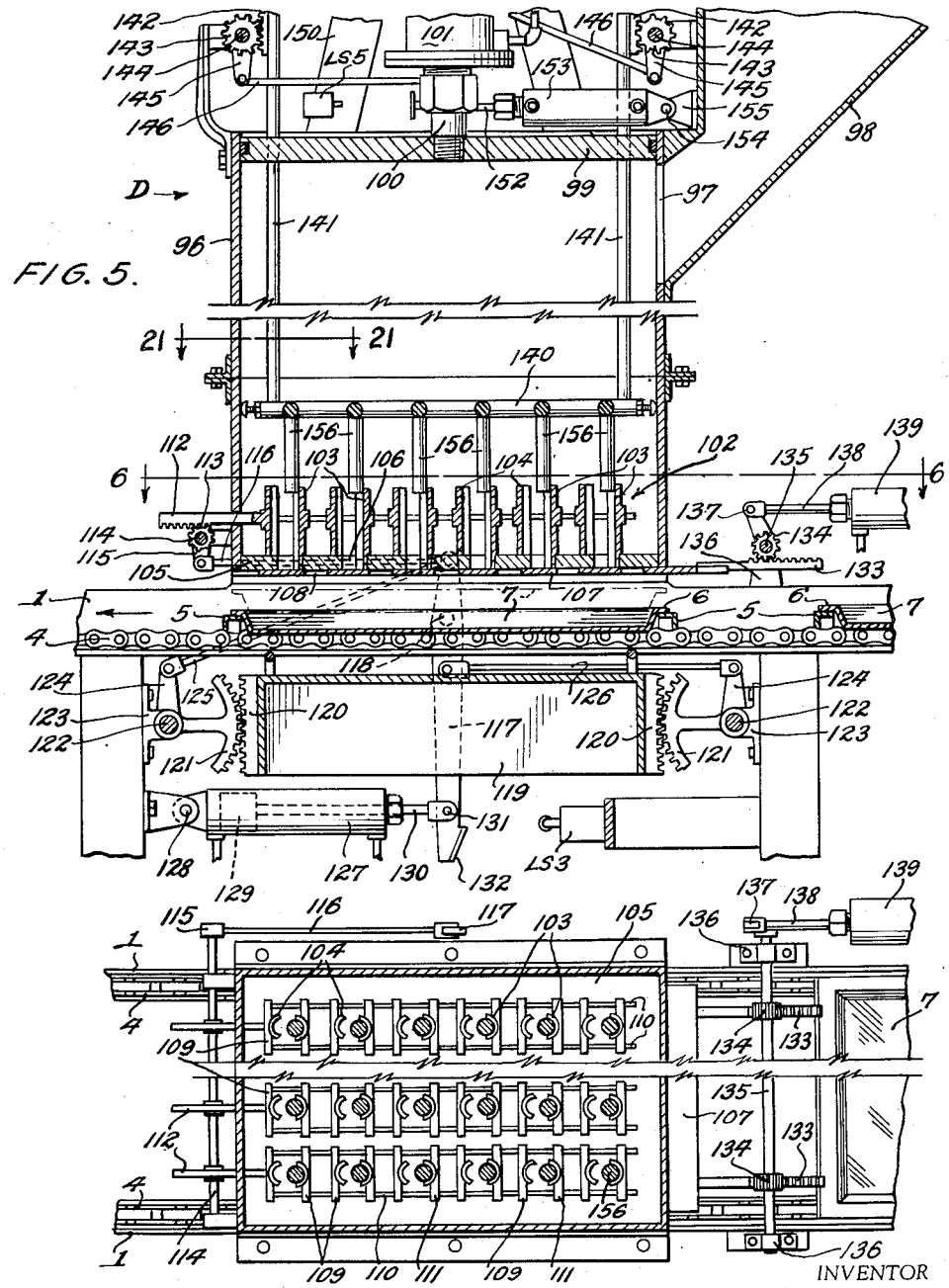
Fig. 5 is a detail medial vertical sectional view taken through the dough-discharging or dispensing hopper and pan-elevating means of the deposit mechanism.
Fig. 6 is a horizontal sectional view along the line 6—6 of Fig. 5.

The machine of the present invention, as illustrated in the single embodiment shown in the accompanying drawings, comprises an elongated frame 1 composed of a plurality of rigidly united, structural, metallic members. At the front end of the machine, that is, the end thereof which appears at the right of Figs. 1 and 2, the frame 1 rotatably supports a transverse horizontal shaft 2, containing sprockets 3 around which pass endless, articulated, roller-carrying, link chains 4. These chains, or their equivalents, are disposed in transversely spaced, parallel order, the same extending longitudinally of the frame and having their upper and lower runs disposed in vertical planes.

The chains carry at intervals longitudinally spaced, transversely extending angle members 5, the latter forming rests or seats upon which are removably received the horizontally extending peripheral flanges 6 of a plurality of shallow, product-supporting pans or trays 7. Toward the opposite or rear end of the frame, there is provided a second transversely journaled shaft 8, carrying sprockets 9 around which the chains 4 pass, as said chains are guided from their upper pan-advancing into their bottom or return runs. The lower part of the frame 1 carries a beach 10 on which idler rollers or guide sprockets 11 are mounted, the latter engaging with the lower or return runs of said chains for guiding the same longitudinally of the frame, as shown more particularly in Fig. 2.

Carried by the frame 1, beneath the bench 10, is an electric motor 12. The armature shaft of this motor carries a sprocket 13 which, as shown in Fig. 4, has trained thereover one end of an endless chain 14, the latter at its opposite end being also trained over a sprocket 15, which is mounted upon the operating shaft of an air compressor 16 arranged on the bottom of the frame 1 adjacent to the motor 12. The compressed air outlet 17 of the compressor extends to a tank or working reservoir 18 in which compressed air, or other equivalent operating fluid, is retained in sufficient volume to operate the various servomotors or cylinder-piston assemblies used in the actuation of the various coordinated mechanisms employed in the present invention.

The armature shaft of the motor 12 carries, as shown in Fig. 4, a second sprocket 19. Around the latter sprocket, an endless chain 20 passes to the teeth of a companion sprocket 21, the latter being fixed on a first drive shaft 22 which extends transversely of the frame 1 and is journaled for rotation in bearings, shown at 23 and 23', mounted on said frame. One of the bearings, shown at 23' in Fig. 22, carries a countershaft 24. Fixed on this countershaft is a gear 25 which meshes with the teeth of a similar gear 26, the latter being carried by the outer end of the shaft 22. The outer end of the shaft 24 carries a sprocket 27 around which is trained a chain 28, the latter extending upwardly of the frame in order to drive a rounder mechanism, hereinafter described, and which is indicated generally by the letter R.

Fixed to the shaft 22 is another sprocket 29. Engaged with the teeth of this sprocket are the links of an endless chain 30, the latter being trained over a second sprocket 31 which is carried by a second countershaft shown at 32, the latter being rotatably supported at its ends in frame-carried bearings 33. Also, mounted for rotation with the shaft 32 is a sprocket 34 around which passes an endless chain 35 which leads to a sprocket 36 fixed on a third drive shaft 37, the latter being supported at its ends for rotation in bearings 38 carried by the frame 1 and in parallel relation to the shafts 22 and 32.

The sprocket 36 forms a part of a single revolution clutch mechanism C which has been illustrated particularly in Figs. 23 and 24. This single revolution clutch comprises a companion sprocket 39 which is mounted fixedly on the drive shaft 37 adjacent the sprocket 36. The sprocket 36 has a hub portion forming a ratchet wheel 40. Normally spaced from the peripheral teeth of this ratchet wheel is a lug 41 formed on a pivotally mounted arm 42, the latter being pressed by a spring 43 in a direction causing the lug 41 to engage with the teeth of the ratchet wheel 40 by turning about a pivotal connection 44 joining one end of the arm 42 with the sprocket 39.

Normally, the outer end of the arm 42 engages with a plunger 45 carried by a piston 46 which is slidably mounted in a cylinder 47. A spring 48 is positioned within the cylinder and engages the piston 46 in a manner forcing the plunger 45 thereof outwardly to move plunger 45 into the path of the outer end of the pivoted arm 42, so that when the arm 42 is in contact with the plunger, the lug 41 thereof will be held out of engagement with the teeth of the ratchet wheel 40. However, when air, or other fluid, is admitted under pressure into the cylinder 47 by way of the inlet pipe shown at 49, the piston 46 therein is pushed longitudinally against the resistance of the spring 48, thereby withdrawing the plunger 45 from contact with the outer end of the arm 42 and allowing the latter to swing under the influence of the spring 43, so that the lug 41 will be brought into contact with the teeth of the ratchet wheel, thus causing synchronous operation and rotation of the sprockets 36 and 39. Air under pressure is admitted momentarily into the cylinder so as to withdraw the plunger 49 from operative engagement with the outer end of the arm 42. Thereafter, the plunger returns to its normal position under the influence of the spring 48, so that when the sprocket 36 makes a complete revolution, the engagement of the arm 42 with the plunger withdraws the lug 41 from contact with the teeth of the ratchet wheel 40 and interrupts the drive through the single revolution clutch.

A chain 50 passes around the sprocket 39 and extends to a sprocket mounted on the conveyor shaft 8, whereby to produce intermittent rotation of the shaft 8 and corresponding movement of the chains 4, causing step by step advance of the pan or tray-holding conveyor mechanism.

A third sprocket 51 is fixed to the shaft 37, and passing around the same is a chain 52 which leads to a sprocket 53 fixed on a fourth drive shaft, shown at 54, the latter having its ends journaled in frame-carried bearings, shown at 55. On the outer end of the shaft 54 there is fixed a sprocket 56 which drives an endless chain 57, the latter extending to a sprocket 58. The sprocket 58 is carried on one end of a transversely journaled shaft 59 which carries a drum 60 around which passes an endless belt 62. The belt 62 has its forward end trained over a small roller 61 journaled transversely in the frame 1 immediately to the rear of the sprocket 9, so that the upper surface of the endless belt 62, which is trained over the drum 60 and the roller 61, will receive pans or trays discharged from the main conveyor and conduct the same rearwardly of the frame.

On the rear end of the frame is a limit switch, indicated at LS1. The actuating element of this switch is disposed in the path of movement of the pans or trays, so that when said pans or trays reach the rear end of the frame 1, and are disposed over the belt 62, a second single revolution clutch, indicated generally at 63, is operated to actuate means for moving the pans laterally of the rear end of the frame and to deposit the same upon a short, parallel, forwardly extending, discharge conveyor 64.

The clutch 63 is the same in working principle as the clutch C. Therefore, a detailed description of the various parts of the second clutch 63 need not be given, except to state that the same is provided with a cylinder 65 corresponding in construction and purpose to the cylinder 47.

The shaft 54 is provided with a sprocket 66 around which passes a chain 67 which leads to a sprocket 68 loosely mounted on a transversely extending shaft 69, the latter being journaled in the frame 1 at its rear end, as shown in Fig. 4. Fixed to the shaft 69, and mounted adjacent the sprocket 68, is the pawl-driven collar 70. When the plunger 71, carried by a sliding piston arranged in the cylinder 65, is retracted, the sprocket 68 and collar 70 rotate in unison through approximately 360 degrees of travel. At the end of this travel, the plunger 71 will have been extended to engage the pawl of the clutch 63 so that the drive through the sprocket and collar 68 and 70 will be interrupted, as will be readily understood.

The outer end of the shaft 69 carries a bevel gear 72 which meshes with a similar gear 73, the latter being fixed on one end of a short, longitudinally extending shaft 74 carried by the frame 1. The rear end of the shaft 74 carries a sprocket 75, and around this sprocket there is trained an endless chain 76, the latter extending upwardly to a sprocket 77 fixed on one end of a short, longitudinally extending shaft 78. The shaft 78 is employed to drive a pan-pushing and transferring mechanism, shown more particularly in Fig. 27. This pushing mechanism consists of a frame 79 arranged above the discharge end of the main conveyor 4.

Carried by the shaft 78 are sprockets 81 around which pass endless chains 82, the latter being also trained over sprockets 83 mounted on a frame-supported shaft 84. Carried by the chains 82 at longitudinally spaced intervals are pusher flights 85 which are adapted to engage pans or trays 7 positioned on the belt 62 and move the same transversely and horizontally of the rear end of the frame 1, so that said pans or trays will be deposited upon the upper and forwardly advancing run of the discharge conveyor disclosed at 64. It will be understood that the actuation of the limit switch, indicated at LS1, is effected by the engagement therewith of a pan or tray carried by the belt 62. This provides, as will be here- after explained in detail, for the admission of compressed air or the like into the cylinder shown at 65 to control the operation of the single cycling rotation clutch 63. The extent of this rotation is sufficient to move a dough-filled pan or tray from the main conveyor and position the same on the discharge conveyor 64.

To actuate the discharge conveyor, as shown in Fig. 27, one end of the shaft 59 carries a gear 86, the teeth of the latter meshing with a companion gear 87 fixed on one end of a shaft 88, the latter constituting the drive shaft of the discharge conveyor. The shaft 88 carries spaced sprockets 89 around which pass chains 90, the latter being connected at intervals by transversely extending slats or bars 91 which provide a support for the pans or trays 7 on the discharge conveyor. Said latter conveyor includes a stationary frame 92 which serves to receive rotatably at one end thereof the shaft 88, and at the opposite or forward end thereof a corresponding shaft 93, the latter being equipped with sprocket 94 around which pass the chains 90.

With the machine constructed as disclosed and described, it will be understood that the pans or trays 7 are received at the forward end of the frame 1, as shown at the right of Fig. 1, the upper side portions of the frame 1, substantially throughout the length thereof defining spaced parallel, longitudinally extending guides. The pans are placed in cradles formed by and between the angle members 5 of the chains 4. As shown in Fig. 30, when the pans are initially positioned in the forward end of the frame 1, the flanges 6 of said pans or trays contact a limit switch, disclosed at LS2. This limit switch is electrically connected with control valves, hereinafter defined, by which the pneumatic operation of the cylinder 47 of the single cycling revolution clutch C is regulated.

After the pans have been thus deposited on the primary conveyor, the same are moved intermittently and brought into registration with a deposit mechanism, indicated at D. As a result of the operation of the deposit mechanism, as hereinafter more particularly described, a series of relatively small dough pellets, balls, or bodies shown at 95 are deposited simultaneously in rows on the upper surfaces of the pans or trays. After each pan or tray has been so filled with the deposited dough bodies, the primary conveyor is actuated to move each pan or tray into registry with the rounder mechanism R. As will be presently explained, this rounder mechanism operates on each of the dough bodies positioned on the pans or trays to impart a desired uniform shape or configuration thereto in controlling the shape of the finally baked products. At the conclusion of the rounding operation, the pans or trays with the rounded or shaped dough bodies positioned thereon, are advanced to the apron conveyor, indicated by the belt 62, thereby reaching the discharge or rear end of the frame 1. At this time, the pusher mechanism, indicated at P, which comprises the chain driven flights 85, engages the pans or trays and moves the same laterally from the longitudinal plane of the primary conveyor to that of the discharge conveyor 64. When deposited on the discharge conveyor, the filled pans or trays are then moved forwardly to a position permitting the same to be removed and placed on trucks, not shown, for convenience in transferring the same to a proofing room and thereafter to baking ovens.

As shown more particularly in Figs. 5 and 6, the deposit mechanism, by which small bodies, pellets, or balls of dough, indicated at 95 are deposited on the pans or trays 7, comprises a vertical duct 96 supported in connection with the frame 1 above the primary conveyor. The upper part of the duct 96 is formed with an opening 97 which communicates with a mixed dough-admitting chute 98. Mixed baker's dough in a plastic condition is fed into the upper end of the duct 96 from the chute or hopper 98 and drops gravitationally toward the bottom of said cylinder. Positive advance of the dough so introduced is effected by means of a ram, shown at 99, which is slidable in the upper portion of the rectangular duct 96. This ram is connected with the lower end of a rod 100 which extends vertically and has its upper end connected with a piston slidably mounted in a fluid-actuated cylinder 101, the latter being arranged above and in axial alignment with the duct 96, as shown especially in Fig. 2. As the ram 99 moves downwardly in the duct 96, dough disposed beneath the ram is positively forced in a downward direction and into a plurality of separable cylinder sections 102.

Each of these cylinder sections comprises a stationary half 103 and a movable half 104. Each of the stationary halves has its lower end fixed in a plate 105 positioned in the bottom of the duct 96, said plate, in alignment with the bottom of each cylinder section, being formed with an opening 106. When the cylinder sections are to be filled with dough, through the descent of the ram 99, the said sections are relatively separated, as shown in Fig. 5, and the openings 106 are closed by means of a sliding valve plate 107 which is arranged below the stationary plate 105, the plate 107, also, being formed with openings 108 which are adapted to register with the openings 106 when the dough bodies 95 are forcibly ejected from the deposit mechanism.

In order to close the cylinder sections, so that the halves 103 and 104 of each thereof will be brought together, as in Fig. 17, each of the movable halves has connected therewith a transversely extending bar 109. The bars 109 are joined by spaced, parallel, longitudinally extending rods 110, the latter sliding into openings formed in the ends of stationary bars 111 carried by the stationary halves 103. At one end of each longitudinal row of the cylinder halves, the bars 109 of the movable sections 104 are joined with toothed plunger racks 112. Engaged with the teeth of the racks 112 are pinions 113, the latter being carried by transversely journaled shafts 114. As shown in Fig. 6, one end of the shaft 114 carries a crank 115 to the lower end of which is pivotally connected the outer end of a rod 116, the opposite end of said rod being pivotally connected to the upper end of an oscillatory lever 117, the latter being pivotally mounted, as at 118, in connection with the frame 1 of the machine.

When the pans or trays 7 are in registry with the deposit mechanism D, the said pans are raised so that the same will be disposed immediately beneath the dough body outlets provided by the openings 106 and 108. To raise and lower the pans, I employ a pan elevator, disclosed at 119 in Fig. 5. To raise and lower the elevator, the same has been shown in this instance as being provided with rack teeth 120, the latter meshing with oscillatory toothed sectors 121. These sectors are carried by rock shafts 122 which are journaled in bearings 123 carried by the frame 1. The rock shafts carry crank arms 124, and the outer ends of these crank arms are joined, by means of links shown at 125 and 126, with the lever 117, the links 125 and 126 being connected equidistantly on opposite sides of the pivotal connection 118 which unites the lever 117 with the frame 1, as shown in Fig. 3.

To impart rocking movement to the lever 117, there is provided a cylinder 127. One end of the cylinder 127 is pivoted, as at 128, on the frame 1 in effecting the support of said cylinder in an articulated manner. Within the cylinder 127, there is mounted a sliding piston 129, and connected with this piston is a rod 130 which extends exteriorly thereof and is pivotally united, as at 131, with the lower end of the lever 117. As will be later described, fluid under pressure is admitted into one end or the other of the cylinder 127, reciprocating the piston 129 therein in a manner rocking the lever 117 and oscillating the sectors 121 to raise or lower the pan elevator 119. When the elevator is raised, the pan or tray 7 assumes the position disclosed in dotted lines in Fig. 5 where it will be in position to receive the dough bodies in precise order. A limit switch LS3 is carried by the frame 1 in a position to be engaged by the lower angular end 132 of the lever 117 when the latter is swung to an extreme position, whereby to control the admission of fluid under pressure into the cylinder 127, as will be later defined in detail, in regulating the raising and lowering of the pan elevator 119.

Similarly, the movable valve plate 107 is formed at one side thereof with rack extensions 133. The teeth of these extensions engage the pinions 134 carried by a transversely extending shaft 135 journaled in brackets 136 mounted on the frame 1. The outer end of the shaft 135 carries a crank 137 to the outer end of which is pivotally connected the forward end of a piston rod 138. The opposite end of this piston rod is joined with a piston, not shown, slidably mounted in a cylinder 139 mounted as at 139a on the frame 1. Compressed air or the like is admitted to this cylinder at timed intervals to effect the rocking actuation of the shaft 135 and the consequent back and forth movement on the part of the valve plate 107, thereby opening or closing the outlet openings 108 for the forced expulsion of dough bodies from the deposit mechanism D.

Such forced expulsion of the dough bodies is effected in this instance by the provision of a plunger frame 140 which is slidably mounted in the duct 96. As shown, the duct 96 is rectangular in horizontal cross section, and the frame 140 is similarly shaped. Arising from the four corners of the frame 140 are fixed upstanding rods 141. The rods 141 extend through openings formed in the vertical ram 99, and have their extreme upper ends provided, as shown in Fig. 5, with toothed rack bars 142. These bars are engaged with the teeth of pinions 143 fixed on transversely extending frame journaled shafts 144. Depending from each of the shafts 144 is a crank arm 145, and connected with the lower end of each of the arms 145 is a link 146. Each link 146 has its inner end pivotally connected, as at 147, with the opposite ends of a crank arm 148, the latter being pivotally mounted, as at 149, in connection with a stationary frame 150, as shown more particularly in Fig. 26.

The lower end of the crank arm 148 is pivotally connected, as at 151, with the outer end of a piston rod 152, the latter being carried by a slidable piston mounted for reciprocation in a cylinder, shown at 153, the cylinder having one end thereof pivoted, as at 154, on a frame bracket 155. When the piston in the cylinder 153 has reached a given point of advance, the rod 152 contacts the actuating extremity of a limit switch, indicated at LS5, thereby regulating the flow of fluid to the cylinder 152 in a manner governing the rise and fall of the ejector frame 140, as will be defined in greater detail later.

It will be noted that the ejector frame 140 includes a plurality of depending plungers 156. These plungers, as shown more particularly in Figs. 18 and 19, are adapted to enter the upper ends of the cylinder sections 103 and 104 when the latter are closed, and to move downwardly therein to forcibly eject dough, confined in said cylinders, through the valved openings 106 and 108, producing deposit of the bodies 95 on the elevated pans or trays 7. Following such deposit, the elevator is lowered, moving the pans downwardly so that the same seat on the transverse chain members 5. The primary conveyor chain is then again actuated to move the pans or trays from their positions of registry with the deposit mechanism to a position of registry with the rounder mechanism R, the specific construction of which, as shown, will now be described in detail.

The rounder mechanism comprises a boxing, disclosed at 160. This boxing extends transversely of the frame 1 and has mounted in the lower portion thereof a rotatable shaft 161, the latter being supported by bearings, shown at 162. One end of the shaft 161 projects through the boxing or housing 160 and carries a sprocket 163. Around this sprocket the endless drive chain 28 extends. The lower end of this chain as previously described passes around the sprocket 27 which is mounted on the outer end of the drive shaft shown at 24.

The boxing 160 is resiliently supported for vertical movement in connection with the frame 1 by springs, indicated at 166. The lower ends of these springs rest on a transversely extending member 167 carried by the frame 1, as shown in Fig. 8. Since the boxing or housing is mounted to move vertically with respect to the frame 1, slack is taken up in the drive chain 28 by means of an idler, shown at 168. This idler, as indicated in Fig. 12, contacts the chain 28 inwardly thereof. The idler is carried by the outer end of a pivotally mounted arm 169, the latter being turnable on the pivot 170 carried by the frame bar 171. A link 172 is pivotally connected, as at 173, at its lower end with the arm 169, while the upper end of the link is pivotally connected, as at 174, with the lower part of the boxing or housing 160. The arm supporting the idler 168 is thus compelled to move with the vertical adjustment of the boxing to maintain the tautness of the chain 28, thus enabling the same properly to drive the shaft 161 in all the operating positions of the vertically adjustable boxing.

The opposite ends or sides of the boxing 160 include upwardly directed, relatively thin, hollow extensions 174'. Rotatably mounted in these extensions are vertical shafts 175 and 175a which, at their lower ends, carry pinions 176, the teeth of which mesh with those of gears 177 carried by the ends of the shaft 161. The upper ends of the shafts 175 project above the extensions 174' and have fixed thereto eccentrics 178 which are mounted in openings provided therefor in the ends of a hollow rounder head 179. This head includes a casing 180 adapted for the reception of a finely divided material, such as flour, starch, or the like.

Depending from the underside of the casing are rounder tubes 181, there being one of these tubes for each of the dough bodies or pellets 95 positioned on a registering pan or tray 7. Each of the tubes includes a cylindrical metallic body threaded at its upper end into openings 182 formed in the bottom wall 183 of the casing 180, as shown in Fig. 9. Partly closing the upper end of each of the tubes 181 is a disk 184 which is formed with a plurality of fine passages or ports 185. The flour, starch, or other finely comminuted material, contained within the casing 180, is adapted to be fed in a positive manner through the ports or passages 185 in this instance by means of a plurality of wire bristle wheels, shown at 186. The peripheral portions of these wheels contact the upper surfaces of the disks 184, maintaining the ports or passages in an open condition so that the finely divided material within the casing 180 may drop downwardly through the ports or passages into the interior of the tubes 181, contacting the walls of the latter as the same are oscillated jointly in a horizontal plane by the action of the rotary eccentrics 178. The finely divided material thus deposited on the inner walls of the tubes 181 prevents adherence between the dough bodies or pellets 95 and the rounder tubes 181. If desired, these inner tube walls may be provided with coarse, threadlike projections 187 which further assist in the shaping and rounding of the dough bodies.

One of the extensions 174' may be provided with a bracket 188, as shown in Figs. 7 and 11, to which is pivoted by a bolt passing through a lug on the rounder head and a slot in bracket 188, as at 189, the lower portion of one side of the casing 180. Due to the rotating eccentrics 178, an oscillatory rotary action is imparted to the casing 180 which, in conjunction with the rotating wheels 186, produces positive discharge of the finely divided flour or other material into the shaping or rounding tubes 181. The oscillatory motion of the head is jointly imparted to the tubes 181 and thence to the pan-sustained dough bodies 95, rounding the latter into a desired shape to produce commercial sandwich buns.

The entire head 179 is adapted to be lowered when the tubes are brought into contact with the dough pellets or bodies 95, the head 179 being lowered from the raised position disclosed in Figs. 7 and 8 to the lowered position set forth in Fig. 10.

To accomplish this raising and lowering of the rounder boxing, the latter is provided on opposite sides thereof, as shown in Fig. 7, with rack teeth 190. Engaged with these teeth are pinions 191 which are carried by transversely extending shafts 192. One of these shafts carries a crank arm 193 which is pivotally connected, as at 194, with the outer end of a piston rod 195. The inner end of the piston rod is connected with a slidable piston mounted in a cylinder, shown at 196, the cylinder being pivotally mounted at one end, as at 197, in connection with the frame 1. Through sliding movement of the piston in the cylinder 196, turning movement is imparted to the pinions 191 at timed intervals in a manner raising and lowering the rounder tubes 181, thereby bringing the latter into and out of contact with the dough boddies 95. The oscillatory motion imparted to the rounder casing as a result of the eccentric drive 178 produces movement on the part of the tubes 181 which shapes the dough bodies into required contours. The motion imparted to the shaft 192 carrying the crank 193 is imparted to the other shaft 192 on the opposite side of the boxing 160 and in uniform degree by the rack frame 197a, shown in Fig. 31.

In order to impart rotary motion to the bristle wheels 186, the upper end of the shaft 175a, shown in Fig. 12 above the eccentric 178, carries a gear 198 which meshes with a corresponding gear 199. The gear 199 is carried by the upper end of a short shaft 200, the latter being supported at its lower end by a shelf 201 forming a part of the head casing 180.

The shelf is provided with a bracket 202 in which the upper end of the shaft 200 is supported. Also carried by the shaft 200 is a worm 203, the teeth of which mesh with those of a worm gear 204 mounted in connection with a horizontally journaled shaft 205.

The shaft 205 is journaled in bearings 206, and one end thereof has slidably keyed thereon a sliding clutch sleeve 207. To operate this sleeve, there is provided a yoke-shaped arm 208, the latter being pivoted, as at 209, on one side of the casing 180. The arm 208 is pivotally connected, as at 210, adjacent its outer end with the outer end of a piston rod 211, the said rod having its inner end connected with a piston 212 mounted for sliding movement in a cylinder, shown at 213. Air under pressure enters said cylinder through the hose connection joined at one end thereof, as indicated at 214. A coil spring 215 connects the outer end of the arm 208 with a bracket 216 joined with the cylinder 213, the spring 215 serving to return the piston to a normal position when air is withdrawn from one side of the cylinder 213, thus separating the clutch member 207 from a companion clutch member 217.

The clutch member 217 is carried on one end of a shaft 218 which is journaled in bearings 219 carried by the casing 180 in longitudinal alignment with the shaft 205. When the clutch members 207 and 217 are interconnected, motion is imparted from the shaft 205 to the shaft 218 on which the clutch member 217 is mounted. At one end, the shaft 218 carries a bevel gear 220 which meshes with a corresponding gear 221 mounted on one end of a transversely journaled drive shaft 222, the latter being journaled in bearings formed in connection with a gear chamber 223 provided in one end of the casing 180. The drive shaft 222 extends longitudinally through the chamber 223 and carries thereon a plurality of longitudinally spaced gears 224, the latter meshing with corresponding gears 225. The gears 225 are mounted on the forward ends of parallel shafts 226, the latter being journaled in the walls of the head 179.

Thus, when the clutch 208 is operated to engage the members 207 and 217, rotary motion is imparted to the parallel shafts 226, producing rotation of the wire bristle wheels 186 mounted thereon. These wheels revolve over the upper surface of the disk 184 and serve thereby to effect the forced passage of the fine flour, starch, or the like through the perforations in the disk 184, causing the same to engage the inner walls of the tubes 181 and prevent undue adherence between the dough bodies or pellets 95 and the inner walls of the tubes.

In controlling the admission of compressed air or other operating fluid into the cylinder 196, and raising and lowering the boxing 160, the frame 1, as shown in Fig. 12, is provided with a bracket 227. At the bottom of this bracket, there is arranged a limit switch, indicated at LS6. The actuating extremity 228 of this switch is disposed in the path of movement of a spring-pressed, pivoted arm 229 which is carried by the boxing 160. As the boxing is lowered, the outer end of the arm 229 contacts the switch arm 228, controlling the flow of compressed air to the cylinder 127 in a manner to be explained presently. As the boxing moves upwardly, the arm 229 makes contact with an adjustable set screw 230 carried by the upper portion of the bracket 227. The set screw acts as a stop and partially rotates the arm 229 so that the same will be in a position to engage the limit switch extension 228 when the boxing is lowered. The arm 229, as shown in Fig. 13, has its inner end formed with a hub 229a fixed to a bolt 229b which is journaled in aligned openings formed in bracket ears 229c attached to the boxing. One end of the bolt 229b projects beyond one of said bracket ears and has its outer end threaded for reception of adjusting and locking nuts and a washer, as indicated at 229d. An expansion spring 229e surrounds the bolt and is confined under compression between the washer thereon and an adjoining bracket ear, the spring thereby serving to retain the arm 229 in its adjusted positions of operation.

To hold the pans or trays 7 stationary while the rounding operation is taking place, and with the tubes 181 in contact with the dough bodies 95, there is provided, as shown in Figs. 14 and 15, a plurality of sliding positioning dogs 231. These dogs are slidably mounted in brackets 232 carried by the frame 1. The hollow vertical extensions 174' of the boxing are provided with laterally projecting brackets 233, and the outer ends of these brackets are formed to include depending plates 234, the latter being provided with diagonally extending slots 235. Positioned in these slots are rollers 236 which are carried by the outer ends of the dogs 231.

It will be seen that when the boxings are lowered to bring the tubes 181 into rounding contact with the dough bodies 95, inward sliding movement will be imparted to the dogs 231, causing the fingers 237 formed on the inner ends of said dogs to engage with the corners of the pans or trays 7, thereby holding the pans or trays against movement during oscillatory motion of the rounding head when the same is in active operation. When the rounding head is returned to its elevated position, the dogs are retracted automatically so that the same assume the positions disclosed in Figs. 14 and 15, whereby to permit the primary conveyor to move the pans longitudinally of the frame 1 from one operating position to another.

An indexing or locking device has been disclosed in Figs. 3 and 28. This indexing device comprises a casing 238 which is fastened to the forward part of the frame 1, as shown in Fig. 3. Mounted in the casing 238 is a plunger 239, the latter being pressed upwardly by a coil spring 240 arranged in the casing 238. The upper end of the plunger 239 is adapted to be seated in a notch 241 formed in the peripheral edge of a disk 242, the latter being mounted on the shaft 2 of the primary conveyor. The spring-pressed plunger 239 serves positively to retain the primary conveyor and pans or trays supported thereon in their different positions or stations of intermittent advance. The engagement of the upper end of the plunger 239 with the notch 241 is merely sufficient to act as a restraining force in preventing undue rotation of the shaft 2. Whenever the shaft 2 is rotated by positive means, the inclination of the walls of the notch 241, and also the V-shaped upper end of the plunger 239, permit of rotation of the shaft 2 and the retraction of the plunger 239 against the force of the spring 240. As shown in Fig. 29, one of the conveyor sprockets 3 is provided with a laterally projecting finger 243 which is disposed for engaging contact with a plunger 244 carried by a limit switch LS7.

The operation of the mechanism described above is coordinated through the employment of the electro-pneumatic system diagrammatically illustrated in Figs. 32, 33, and 34 of the drawings. As shown, this system involves the main trunk conductors indicated at L1 and L2 in Fig. 32. Connected with the conductor L1 is the lead 250 which extends to the limit switch LS2, and from the windings of said switch, a continuing conductor 251 extends to the field windings of a solenoid control valve 252. From the control valve, a lead 253 extends to the main conductor L2. Thus, as shown in Fig. 30, the placing of an empty pan or troy on the forward part of the primary conveyor actuates the control switch LS2 to complete the circuit leading to the windings of the solenoid valve 252, producing excitation and operation of the latter.

The solenoid valve 252 is employed in controlling the operation of the single revolution clutch C which involves the sprocket and pawl construction 39 and 42, as shown in Fig. 24 of the drawings. Compressed air is maintained in the tank or reservoir 18, and leading from this tank or reservoir is a pipeline 254, the latter extending to a trunk pipe line 255. Leading from the line 255 is a branch pipe line 256 which leads to the control valve 252.

As shown, the control valve 252 comprises, as indicated in Fig. 34, a casing 257 having a central bore 258. Slidably mounted in this bore is a plunger 259, the latter being formed at its lower end with an annular groove 260. The branch pipe line 256 enters the casing 257 by way of the inlet port shown at 261. This port normally is disposed in registration with the body portion of the plunger 259, and the port is closed since the plunger 259 is maintained positively in a lowered or valve-closing position by means of a coil spring shown at 262 pressing on a collar 263 forming a part of the plunger 259.

When the field coil 264 of the solenoid valve 252 is excited, as effected by the closing of the limit switch LS2 through the placing of a pan 7 on the primary conveyor, the plunger 259 is magnetically attracted by the field coil and elevated against the resistance of the spring 262. This elevation of the plunger brings the annularly recessed portion 260 thereof into registration with the air inlet pipe 256, allowing compressed air to flow from the trunk pipe line 255 into the bore 258 of the valve 252, and thence to flow from said bore by way of an outlet port 265.

This port communicates with a branch pipe line 266 which extends to the air inlet 49 of the cylinder 47 of the single revolution clutch C. The admission of compressed air into the cylinder 47, as previously described, moves the piston 46 therein against the resistance of the spring 48 so that the lug 41 of the detent 42 is engaged with the teeth of the power-driven ratchet wheel 40, producing rotation of the sprocket 39 and the shaft 37. This rotation takes place through approximately 360 degrees, thereby driving the primary conveyor, through shaft 37, chain 50 and shaft 8, sufficiently to move the empty pan or tray from the initial position indicated at P1 in Fig. 1 to the position indicated at P2. This operation leaves the conveyor at position P1 open for the reception of another pan or tray which, in an empty condition, is placed on the primary conveyor, again actuating the limit switch LS2 to produce another incremental longitudinal movement of the pans on the primary conveyor through the operation of the single revolution clutch C.

This incremental movement takes place in a manner causing the pans to be brought into registration with the deposit mechanism D when the pans occupy position P3 of Fig. 1. After the deposit of the roughly formed dough bodies or pellets on the pans, the latter are moved to position P4 of the primary conveyor where the same register with the rounder mechanism indicated at R. From position P4, the pans are moved to position P5 over the belt or apron conveyor 62.

When in position P5, the pans contact with the limit switch LS1. This switch is disposed in a circuit comprising the conductors shown at 267 and 268. The conductor 268 leads to the field winding 269 of a control valve 270 which corresponds in construction and operation to the control valve 252. Therefore, a detailed description of the construction and operation of valve 270 need not be repeated. However, it will be understood that when the solenoid 269 is energized, the control valve 270 is actuated to admit air into the cylinder 65 of the single revolution clutch indicated at 63, thereby producing operation of the transfer conveyor indicated at P and referred to as the pan-pushing mechanism. This mechanism transfers the filled pans from the apron conveyor 62 to the discharge conveyor 64, the latter being driven in unison with the apron conveyor through the operation of the gearing disclosed at 86 and 87 in Fig. 27 of the drawings.

When the pilot valve 252 or 270 is energized to raise the plunger 259 therein, whereby to provide for the flow of compressed air through the valve, the plunger 259 remains elevated against the tension of the spring 262. This period is of sufficient duration to admit compressed air into the cylinders 47 or 65 of the single revolution clutch mechanisms to produce rotation of the driven sprocket of each clutch mechanism through approximately 360 degrees of movement. When the plungers 259 again return to their normal positions, compressed air in the cylinders 47 and 65 is relieved or discharged by way of an outlet port 270 which is formed in the bottom of each of the pilot valves in communication with the annular space or recess 260 of the plunger 259. This bleeding of compressed air from the cylinders 65 and 196 enables the springs therein to operate their respective pistons.

As a result of the rotation of the shaft 2 of the primary conveyor through the operation of the single revolution clutch mechanism C, the limit switch LS7 is closed or actuated. This limit switch, as shown in Fig. 32, is joined with a conductor 271 which leads from the main conductor L1. After passing through the limit switch, a conductor 272 extends to the field winding 273 of a relay switch 274. The relay switch 274 comprises in this instance an armature 275 which is attracted by the energizing of the field winding 273. The armature carries spaced contact heads 276, 277, and 278 which are adapted to be moved, when the relay switch is energized, into engagement with associated stationary contacts 276', 277', and 278', respectively, as shown in Fig. 32. From the winding 273, the conductor 272 extends to the second main conductor L2.

When the head 276 of the relay switch 274 is in engagement with its associated contacts 276', a circuit is completed which comprises the conductor shown at 279'' which extends from line L' and leads to the limit switch LS5. From the switch LS5, the conductor 279' extends to the contacts 276' associated with the head 276, and leading from these contacts is another conductor 279a which leads to the conductors 272 and relay coil 273, thence returning to the line L2. The limit switch LS5 is actuated by the piston rod 152 of the cylinder 153 employed in governing the operation of the plunger frame of the deposit mechanism D. When the rod 152 has been moved in an outward direction to a given extent, the same contacts the actuating extremity of the limit switch LS5, breaking the circuit which maintains the relay switch 274 in its position of closure after having been initially closed by switch LS7.

In governing the operation of the piston in the cylinder 153, there is provided a pilot valve 279 which corresponds in construction and mode of operation to the pilot valves indicated at 252 and 269 and previously described. When the pilot valve 279 is energized, compressed air flows from the trunk pipe line 255 through the valve 279 and thence into a reciprocatory reversing valve 280, which preferably is of the construction specifically disclosed in Fig. 33.

A plurality of these reversing valves are utilized, as shown in Fig. 32, and, therefore, a detailed description of one will suffice for all. Each of said reversing valves, shown at 280, 300, 301 and 302, comprises a casing 281 in which, as shown in Fig. 33, there is formed a bore 282 for the reception of a sleeve 283. Slidably mounted in the sleeve 283 is a slidable, spool-type, pressure-balanced, valve member 284, the latter including outer heads 285 and 286 and an intermediate head 287. Formed between these heads are annular grooves, indicated at 288 and 289. Entering the bottom of the casing 281 is a pipe line 290 which is connected with the pipe line 254 leading from the compressor tank 18. Engaging with one end of the piston-type valve member 284 in each of the reversing valve units is a spring 291 which tends to force the associated valve member toward one end of the bore in which the valve member is slidably mounted. To oppose this action of the spring 291, a pipe line 292 in the case of the valve 280 leads from the pilot valve 279 and enters the end of the reversing valve 280 opposite to that containing the spring 291. Similarly, pipe 292a unites pilot valve 303 with reversing valve 300; pipe 292b unites pilot valve 304 with reversing valve 301; and pipe 292c unites pilot 305 with reversing valve 301.

When the pilot valve 279, for instance, is actuated to admit of the forced flow of air under pressure from the pipe line 255, through valve 279, the line 292 and into reversing valve 280. The air pressure htus admitted into one end of the reversing valve unit 280 pushes the sliding valve member therein against the resistance of the spring 291, causing the valve member to assume the position disclosed in Fig. 33. When in this air pressure held position, it will be noted that compressed air will flow through the reversing valve 280 by way of the entry pipe 290, thence through the port shown at 293 and into the annular groove 289, passing from said groove by way of an outlet port 294 and entering a pipe line 295, thus directing compressed air into one end of the plunger cylinder 153 and actuating the piston in said cylinder to produce rotation of the shafts 144 in a direction moving the plunger frame 140 downwardly and expelling dough bodies from the deposit mechanism through the openings in the sliding valve plate 107.

When the air pressure on the piston head 284 is released, as is effected by the closing of one of the pilot valves associated therewith, the spring 291 acts to force the valve member 284 in a forward direction, positioning the intermediate head 287 at the right of the air inlet pipe 290, so that air under pressure may travel from the pipe 290 through a port 296 and thence outwardly through the pipe 297, the latter extending to the side of the cylinder 153 opposite that with which the pipe line 295 communicates, so as to produce reverse reciprocation of the piston in the cylinder 153. Outlet ports 298 and 299 are provided for venting the interior of the valve 280 to the atmosphere. It will be noted that when the head 284 is positioned as shown in Fig. 33, the exhaust 299 is covered, preventing the escape of air therethrough, while the exhaust port 298 is open so that air may be discharged from one side of the cylinder 153. The reverse holds true when the valve member 284 occupies its other extreme position under the influence of the spring 291.

Similar reversing valves are shown at 300, 301, and 302, which reversing valves are controlled by the pilot valves shown at 303, 304, and 305, respectively. The pilot valves 303, 304, and 305 are the same in construction and operation as the pilot valve 252 and the pilot valve 269. Likewise, all the reversing valves 280, 300, 301, and 302 are of identical construction, the details of which have been illustrated in Fig. 33.

A conductor wire 306 leads from the trunk conductor L1 to the field coil of the solenoid-actuated pilot valve 304, and from the coil of the valve 304, a conductor 306' extends to the limit switch LS6 connected with the rounder mechanism R, and a conductor 306a extends from the limit switch to the line L2. When the switch LS6 is closed, the pilot valve 304 is excited to introduce air under pressure into the reversing valve 301 which governs the operation of the rounder mechanism pan elevator motor 127. When the piston of this motor is moved in one direction, the piston rod 132 thereof engages the actuator of the limit switch LS3, closing the field circuit of the pilot valve 303 and actuating the reversing valve 300 in order to reciprocate the valve plate 107 of the deposit mechanism through reciprocation of the piston in the cylinder 139.

Simultaneously with the closure of the field circuit of the solenoid 303, the field circuit of the pilot valve 279 is closed. The field of the pilot valve 279 is arranged in conductors shown at 307, 307', 307a, and 307b, conductor 307a being connected to limit switch LS3 and conductor 307b being joined with the trunk conductor L2. The field winding of the solenoid provided in the pilot valve 305 is closed by means of a conductor, shown at 308, joined with the line L1 and extending to the contacts 277' associated with the head 277 of the relay switch. From the contacts 277', a conductor 308' leads to the field winding of the solenoid of the pilot valve 305, and a conductor 308a leads from the valve 305 to the main line L2.

Likewise, the pilot valve shown at 309, which is employed to control the energizing of the flour dispenser mechanism 212, is energized by means of a conductor 310 which leads from the line L1 and passes through the third head 278 and contacts 278' of the relay switch and the conductor 310a to the valve 309 and thence by way of line 310b to the line L2.

The reversing valve 300 is joined by means of pipes, shown at 311, with the motor cylinder 139 of the valve plate motor. Likewise, the reversing valve 301 is connected by pipelines 312 with the motor cylinder 127 of the pan elevator used in connection with the deposit mechanism. The reversing valve 302 has joined therewith pipe lines 313 which extend to the actuating cylinder 196 employed in the raising and lowering of the rounder boxing 160.

It will be noted that through the use of the forwardly and longitudinally extending discharge conveyor, a single operator, stationed adjacent the discharge end of the conveyor will be enabled to place empty pans on the forward end of the receiving conveyor and remove filled pans or trays from the discharge conveyor.

While I have set forth and described in detail certain preferred embodiments of the present invention, nevertheless it will be understood that the invention is subject to certain other mechanical variation or modification without departing from the spirit of the invention or the scope of the following claims.

I claim:

1. Dough-handling apparatus comprising: a frame formed with longitudinal guides for the reception and advancement of a plurality of dough-receiving trays, said guides including tray-receiving and discharging ends; an endless primary conveyor movable along said guides for imparting movement to the trays positioned thereon; a power-actuated mechanism for imparting intermittent driving movement to said conveyor, said mechanism including a single revolution clutch device having a movable control element; a pressure fluid-actuated means cooperative with the control element of said clutch device to effect a single revolution on the part thereof in producing an incremental advance of said conveyor and trays engaged therewith along said guides; a container for said pressure fluid; pipe means leading from said container to said pressure fluid-actuated means; an electrically controlled valve positioned in and normally restraining fluid flow through said pipe means; an operating circuit for said valve, said circuit including a switch mounted on said frame contiguous to said guides and operated by the engagement therewith of empty trays deposited on the receiving end of said guides to close said circuit and open said valve; means carried by said frame and coordinated with the intermittent advance of said conveyor to deposit on the trays when the latter occupy one position on said guides separate bodies of dough; and means operative when said trays occupy a second position on said guides to round and uniformly shape said bodies.

2. Dough-handling apparatus as defined in claim 1, and wherein power-actuated means are provided for removing from said primary conveyor filled trays containing deposited and rounded dough bodies without disturbing the relative spacing and positional order of the dough bodies thereon.

3. Dough-handling apparatus as defined in claim 1, and wherein the apparatus is further characterized by the provision of a tray-discharging conveyor means disposed in adjacent parallel longitudinally extending order with said first-named conveyor; and power-driven means for transferring filled trays from said primary conveyor and depositing the same on said tray-discharging conveyor means while the dough bodies contained in said trays occupy substantially the same relative order as produced by said deposit mechanism.

4. Dough-handling apparatus as defined in claim 1, and wherein said frame is provided with means for elevating the conveyor-advanced trays above their normal plane of travel when the trays are brought successively into vertical registry with said deposit means and during intervals of conveyor inactivity.

5. Dough-handling apparatus comprising: a frame; a primary tray-receiving conveyor supported for movement longitudinally on said frame, said conveyor including shafts rotatably journaled in said frame at opposite ends of the conveyor; power-driven means for imparting driving movement to one of the shafts of said conveyor for driving the latter; a dough-dividing and depositing mechanism mounted on said frame, said mechanism including a dough-receiving hopper having a bottom formed with a plurality of outlets; a vertically movable tray-raising and lowering device carried by said frame beneath said hopper outlets coacting with successive trays advanced on said conveyor; a movable dough cutter arranged beneath said hopper and above said device; reversible, reciprocatory, fluid-pressure-actuated means for extruding dough through said outlets, for operating said tray-raising and lowering device and for operating said dough cutter; a rounder mechanism carried by said frame above said conveyor and trays and disposed in spaced relation to said dough-dividing and depositing mechanism, said rounder mechanism including a vertically movable boxing having means thereon to engage and shape bodies of dough deposited on trays positioned on said conveyor; reversible, reciprocatory, fluid-actuated means for raising and lowering said boxing relative to trays positioned beneath the same on said conveyor; a container for a working fluid under superatmospheric pressures; a plurality of pipes for conducting fluid from said container to opposite sides of each of said reversible fluid-actuated means; fluid-flow reversing valves joined with said pipes for governing the direction of entry and exhaust of said fluid into and from each of said reversible fluid-actuated means; an electrically controlled, solenoid actuated, pilot valve for controlling the operating position of each reversing valve; electrical circuit means for effecting energized actuation of said pilot valves; and switch means governed by the movement of said conveyor for initiating closure of said circuit means to energize the pilot valves.

6. Dough-handling apparatus comprising: a frame; a tray-carrying conveyor supported for guided movement longitudinally of said frame; power-driven means for imparting intermittent movement to said conveyor, said means including a single revolution clutch device having a movable control; means for actuating said control embodying a cylinder having a piston mounted therein; biasing means normally serving to maintain said piston in a position in which said clutch device control is held to preclude the transmission of power therethrough; means for introducing a fluid under pressures sufficiently high to move said piston in opposition to the piston-biasing means to cause said piston to assume a position releasing said clutch control, whereby to effect a single power-transmitting revolution on the part of the clutch; a normally closed solenoid valve controlling the introduction of said pressure fluid into said cylinder, said valve having an operating circuit; and a switch operated by the deposit of an empty tray on said conveyor for closing said circuit and energizing said solenoid valve.

7. Dough-handling apparatus comprising: a frame formed with longitudinally extending, horizontally disposed guides; an endless conveyor movable along said guides, said conveyor being formed for the support and advancement of a plurality of removable, flat-bottomed, dough-receiving trays; power-driven means for imparting intermittent movement to said conveyor; a control circuit for said conveyor driving means; a frame-mounted switch disposed for engagement with an empty tray deposited on said conveyor at one end of said frame to actuate the switch and close the control circuit governing the intermittent drive of said conveyor; said conveyor drive means including a single revolution clutch mechanism, said clutch mechanism having driving, driven and coupling members, the coupling member being movable between the driving and driven members for releasing the driven member from the driving member; a cylinder; a spring-pressed piston slidable in said cylinder and cooperative with said coupling member to maintain the same normally in its driving and driven member-releasing position; fluid-actuated means for moving said piston to a position causing said coupling member to unite the driving and driven members of said clutch mechanism for rotation in unison, said fluid-actuated means including a source of pressure fluid supply; pipe means extending from said source to said cylinder; a normally closed solenoid valve disposed in said pipe means for governing the flow of pressure fluid to said cylinder, said valve including a field coil arranged in said control circuit and operative when energized to open the valve to provide for fluid flow to said cylinder and the operation of said clutch mechanism.

8. In dough-dividing, depositing and rounding apparatus; a frame; a tray-receiving and advancing conveyor carried by said frame; a stationary hopper mounted on said frame above said conveyor for the reception of dough batches, said hopper having a plurality of restricted dough outlets in the bottom thereof and an internally positioned reciprocatory plunger means for forcing dough through the outlets for deposit on conveyor-positioned trays; a vertically movable rounder mechanism mounted for guided movement on said frame above said conveyor and engageable with dough bodies deposited on said trays for imparting a uniform shape thereto, said rounder mechanism including a flour chamber formed with a plurality of outlets in the bottom thereof, there being rotary brush means mounted in said chamber for maintaining said outlets free from obstructing deposits; power-driven means for driving said conveyor, said drive means including a single-revolution clutch device having a movable control; means for actuating said control embodying a cylinder having a piston movably mounted therein; biasing means normally serving to maintain said piston in a position in which the clutch device control is held to preclude the transmission of power therethrough; means for introducing a fluid under pressures sufficiently high to move said piston in opposition to said biasing means whereby to actuate the control of said clutch device to effect a single power-transmitting revolution on the part thereof in producing intermittent, linear movement of said conveyor; a normally closed, electrically energized, solenoid valve controlling the introduction of the pressure fluid into said cylinder, said valve being included in an operating circuit united with a source of electrical energy; a switch operated by the deposit of an empty tray on said conveyor ahead of said hopper for closing said circuit and energizing said valve to admit the fluid into said cylinder; additional pressure fluid-actuated means for moving the plunger means of said hopper, raising and lowering said rounder mechanism and controlling the operation of the rotary brush means of the rounder mechanism; and electrically actuated valves responsive to the operation of the conveyor for controlling the delivery of pressure fluid to said last-named fluid-actuated means.

9. In dough-dividing, depositing and rounding apparatus; a frame; a tray-receiving and advancing conveyor carried by said frame; a stationary hopper mounted on said frame above said conveyor for the reception of dough batches, said hopper having a plurality of restricted dough outlets in the bottom thereof and reciprocatory plunger means disposed within the hopper for forcing dough through the outlets for deposit on conveyor-positioned trays; a vertically movable rounder mechanism mounted for guided movement on said frame above said conveyor and engageable with dough bodies deposited on said trays for imparting a uniform shape thereto, said rounder mechanism including a flour chamber formed with a plurality of outlets in the bottom thereof, there being rotary brush means mounted in said chamber for maintaining said outlets free from obstructing deposits; power-driven means for imparting intermittent linear motion to said conveyor; said power-driven means including a clutch device; pressure fluid-actuated means governing the operation of said device, said last-named means including a solenoid valve governing the admission of the pressure fluid thereto; a first operating circuit joined with a source of electric current supply and in which said solenoid valve is positioned; a switch operated by the deposit of empty trays on said conveyor for closing said circuit; additional pressure fluid actuated means for moving the plunger means of said hopper, raising and lowering said rounder mechanism and controlling the operation of the brush means of the rounder mechanism; and electrically actuated solenoid valves responsive to the movement of said conveyor for governing the delivery of the pressure fluid to said additional pressure fluid actuated means.

10. In dough-dividing, depositing and rounding apparatus; a frame; a tray-receiving and advancing conveyor carried by said frame; a stationary hopper mounted on said frame above said conveyor for the reception of dough batches, said hopper having a plurality of restricted dough outlets in the bottom thereof and reciprocatory plunger means disposed in the hopper for forcing dough through the outlets for deposit on conveyor-positioned trays; a vertically movable rounder mechanism mounted for guided movement on said frame above said conveyor and engageable with dough bodies deposited on said trays for imparting a uniform shape thereto, said rounder mechanism including a flour chamber formed with a plurality of outlets in the bottom thereof, there being rotary brush means mounted in said chamber for maintaining said outlets free from obstructing deposits; power-driven means for driving said conveyor, said drive means including a single revolution clutch device having a movable control; means for actuating said control embodying a cylinder having a piston movably mounted therein; biasing means normally serving to maintain said piston in a position in which the clutch device control is held to preclude the transmission of power therethrough; means for introducing a fluid under pressures sufficiently high to move said piston in opposition to said biasing means, whereby to actuate the control of said clutch device to effect a single power-transmitting revolution on the part thereof in producing intermittent, linear movement of said conveyor; a normally closed, electrically energized, solenoid valve controlling the introduction of the pressure fluid into said cylinder, said valve being included in an operating circuit united with a source of electrical energy; means driven by said power-driven means for rotating the obstruction-preventing brush means of said rounder mechanism and including a movable power-controlling coupling for connecting and disconnecting the brush-driving means with the power-driven means; an operating means for said coupling embodying a cylinder having a slidable piston therein operatively connected with said coupling; pipe means extending from a source of pressure fluid supply to said coupling cylinder for imparting sliding movement to the piston therein; and a solenoid valve including a field coil, said last-named valve being positioned in the pipe means of said coupling cylinder to govern pressure fluid flow thereto.

References Cited in the file of this patent

UNITED STATES PATENTS

| | | |
|---|---|---|
| 444,379 | Fowler | Jan. 6, 1891 |
| 554,273 | Hueg | Feb. 11, 1896 |
| 1,336,570 | Lathrop et al. | Apr. 13, 1920 |
| 1,664,372 | Mohr | Mar. 27, 1928 |
| 1,706,127 | Pensotti | Mar. 19, 1929 |
| 1,807,295 | Kirchhoff | May 26, 1931 |
| 1,869,033 | Van Houten | July 26, 1932 |
| 1,948,870 | Pointon et al. | Feb. 27, 1934 |
| 2,286,983 | Beutel | June 16, 1942 |
| 2,380,172 | Harber | July 10, 1945 |
| 2,383,536 | Elliott | Aug. 28, 1945 |
| 2,704,612 | Johnston et al. | Mar. 22, 1955 |